United States Patent
Sawada

(10) Patent No.: US 6,878,268 B2
(45) Date of Patent: Apr. 12, 2005

(54) APPARATUS FOR PURIFICATION OF WATER

(76) Inventor: Yoshiyuki Sawada, 28-2, Ohaza-Atsumogo, Toyoura-cho, Toyoura-gun, Yamaguchi (JP), 759-6314

(*) Notice: Subject to any disclaimer, the term of this patent is extended or adjusted under 35 U.S.C. 154(b) by 32 days.

(21) Appl. No.: 10/111,526
(22) PCT Filed: Sep. 21, 2001
(86) PCT No.: PCT/JP01/08279
§ 371 (c)(1),
(2), (4) Date: Apr. 23, 2002
(87) PCT Pub. No.: WO02/26639
PCT Pub. Date: Apr. 4, 2002

(65) Prior Publication Data
US 2002/0162801 A1 Nov. 7, 2002

(30) Foreign Application Priority Data
Sep. 28, 2000 (JP) .................................... 2000-297256

(51) Int. Cl.$^7$ ................................................ C02F 1/463
(52) U.S. Cl. ................. 210/199; 204/269; 204/275.1; 205/743; 205/745; 205/755; 210/96.1; 210/205; 210/748
(58) Field of Search ............................... 204/269, 275.1; 205/743, 745, 755; 210/96.1, 199, 205, 206, 709, 717, 724, 725, 743, 705, 748

(56) References Cited

U.S. PATENT DOCUMENTS

| | | | |
|---|---|---|---|
| 2,158,595 A | | 5/1939 | Slagle |
| 4,163,716 A | * | 8/1979 | Turnbull ..................... 210/665 |
| 5,308,501 A | * | 5/1994 | Eckert ......................... 210/718 |

(Continued)

FOREIGN PATENT DOCUMENTS

| | | |
|---|---|---|
| EP | 0 941 970 | 9/1999 |
| JP | 52-035459 | 3/1977 |
| JP | 52-115553 | 9/1977 |

(Continued)

OTHER PUBLICATIONS

Database WPI Week 198712, Jul. 30, 1986 Derwent Publications Ltd., London, GB; AN 1987-085123 XP002294820 Ponomareva V N; Zaitsev S V: "Effective purification of natural water for drinking– by electro–coagulation using soluble iron electrode in presence of aluminium sulphate and then using insoluble electrode" & SU 1 247 349 A (Lengd Eng Cons Inst), Jul. 30, 1986 * abstract *.

Primary Examiner—Peter A. Hruskoci
(74) Attorney, Agent, or Firm—Jordan and Hamburg LLP

(57) ABSTRACT

Provided are an apparatus and a method for purification of water in which impurities in contaminated water can be removed with a reduced amount of flocculant and with high efficiency. The apparatus comprises, in the order from the side where contaminated water is introduced, an electrolysis tank (1) for electrolyzing the contaminated water, a gas mixing tank (2) for mixing carbon dioxide into the contaminated water electrolyzed, a coagulation tank (3) for mixing $Fe^{3+}$ supplied from a flocculant producing device (7) to coagulate impurities in the contaminated water, and a floatation tank (4) for floating and separating the impurities coagulated. The electrolysis tank (1) electrolyzes the contaminated water to lower zeta potential of colloid particles in the contaminated water, and then the contaminated water is mixed with $Fe^{3+}$ in the coagulation tank (3), thereby reducing the amount of positively charged $Fe^{3+}$ to be added for neutralizing the colloid particles.

1 Claim, 4 Drawing Sheets

U.S. PATENT DOCUMENTS

| | | | |
|---|---|---|---|
| 5,385,653 A | * 1/1995 | Tamarkin | 205/745 |
| 5,421,967 A | * 6/1995 | Tubergen | 210/709 |
| 5,531,865 A | * 7/1996 | Cole | 205/751 |
| 5,698,107 A | * 12/1997 | Wurzburger et al. | 210/695 |
| 6,080,300 A | * 6/2000 | Goodwin | 205/751 |
| 6,488,835 B1 | * 12/2002 | Powell | 205/744 |

FOREIGN PATENT DOCUMENTS

| | | |
|---|---|---|
| JP | 57-053287 | 7/1982 |
| JP | 61-216799 | 9/1986 |
| JP | 62-102891 | 5/1987 |
| JP | 62-258800 | 11/1987 |
| JP | 06-047382 | 2/1994 |
| JP | 07-100472 | 4/1995 |
| JP | 08-039075 | 2/1996 |
| JP | 11-169868 | 6/1999 |
| WO | 90/15025 | 12/1990 |
| WO | 99/01382 | 1/1999 |

* cited by examiner

(a)

(b)

APPARATUS FOR PURIFICATION OF WATER

FIELD OF THE INVENTION

The present invention relates to an apparatus and a method for purification of water to remove impurities in water which is introduced from rivers, lakes, ponds and the like.

BACKGROUND OF THE INVENTION

As one of the methods for removing impurities in contaminated water, known is a chemical method in which some chemicals are added to the contaminated water as flocculants to coagulate the impurities contained in the contaminated water using a counter ion effect. Particles having a dimension ranging from $10^{-9}$ to $10^{-6}$ m, which are suspended in the contaminated water, are called colloids. As colloids cannot be easily separated by natural precipitation or filtration, the above chemical method is intended to coagulate such fine particles to form larger particles to a certain extent and separate them.

Colloid particles have been charged, and positive ions are attached onto the surface of a negatively charged particle to cause specific absorption, around which a diffusion layer of ions is formed. The movement of the particles generates zeta potential of −20 to −30 mV on a slip plane between the particle and the diffusion layer. As the zeta potential generates a major portion of the repulsion energy between the particles to form an energy barrier, a flocculant is used to neutralize the zeta potential, thereby reducing the potential barrier to make the particles absorb each other.

Flocculants are roughly divided into inorganic salts, organic high-molecular compounds and flocculation agents. In the inorganic salts which are often used, aluminum sulfate, basic aluminum chloride, ferric sulfate and ferric chloride are exemplified as typical ones. When a flocculant of an inorganic salt is added to contaminated water and stirred, positively charged metal ions in the flocculant neutralize the negative zeta potential of the colloid particles in the contaminated water and absorb them.

Thus, when a flocculant is added for neutralizing the zeta potential of colloid particles, positively charged metal ions are required in an amount corresponding to the negative zeta potential. Therefore, the larger the negative zeta potential in the contaminated water, the more metal ions required to be reacted, and it becomes necessary to add a large amount of flocculant for removing the impurities in the contaminated water.

If a large amount of flocculant is added for coagulation, the amount of the coagulated sediments also becomes larger depending on the increased flocculant, which leads to an additional burden in the work for collecting the coagulated sediments. Furthermore, some kinds of flocculants would affect nature. Accordingly, it is desirable to control the amount of flocculant used as small as possible.

In view of the above, the object of the present invention is to provide an apparatus and a method for purification of water which enable the efficient removal of impurities in contaminated water with a reduced amount of flocculant.

DISCLOSURE OF THE INVENTION

An apparatus for purification of water according to the present invention is an apparatus which coagulates and separates impurities in contaminated water by a counter ion effect of a flocculant, comprising an electrolysis tank for electrolyzing the contaminated water, the electrolysis tank being provided before or after a coagulation tank which enables contact between the contaminated water and the flocculant. A method for purification of water according to the present invention is a method for coagulating and separating impurities in contaminated water by a counter ion effect of a flocculant, in which the contaminated water is electrolyzed and then the flocculant is added to the resultant contaminated water, or the flocculant is added to the contaminated water and then the resultant contaminated water is electrolyzed.

According to the present invention, the zeta potential of colloid particles in contaminated water approaches zero by electrolysis, which can lower the zeta potential of the colloid particles. Therefore, the amount of the positively charged flocculant added for neutralizing the colloid particles with the lowered zeta potential can be reduced, thereby coagulating impurities in the contaminated water with a high degree of efficiency.

The electrolysis tank for electrolyzing contaminated water is preferably provided either before or after a coagulation tank depending on the water quality of the contaminated water or the kind of impurities in the contaminated water. Basically, the electrolysis tank is provided before the coagulation tank and, after electrolysis of the contaminated water, a flocculant is added to the resultant contaminated water to coagulate the particles. Nevertheless, even if a flocculant is added to the contaminated water and then the resultant contaminated water is electrolyzed, the zeta potential of the colloid particles in the contaminated water can be lowered, and it is also possible to efficiently coagulate the impurities in the contaminated water with a reduced amount of flocculant.

As a flocculant, metal ions which are obtained by dissolving a metal plate made of iron, aluminum, copper, zinc or the like by electrolysis, can be selectively used depending on the ingredients of the impurities dissolved in the contaminated water. Most preferably, ferric ions ($Fe^{3+}$) are used.

$Fe^{3+}$ is stable compared to $Fe^{2+}$. Unlike $Fe^{2+}$, which tends to be oxidized to become reddish brown FeO, $Fe^{3+}$ hardly colors the water to be treated. Furthermore, if $Fe^{3+}$ is not consumed for coagulation and discharged as it is, it is harmless because iron does not affect human health.

It is further preferable that the apparatus for purification of water of the present invention has a gas mixing tank for mixing carbon dioxide into the contaminated water. By mixing carbon dioxide into the contaminated water to adjust the hydrogen ion concentration exponent of the contaminated water to the optimum value for coagulation, the colloid particles in the contaminated water can very efficiently be coagulated and removed.

It is further preferable that the apparatus for purification of water of the present invention has a detecting means for detecting the hydrogen ion concentration exponent which is provided on the upstream side of the coagulation tank and an adjusting means for controlling the amount of carbon dioxide to be fed into the gas mixing tank based on the hydrogen ion concentration exponent detected by the detecting means. By this structure, it is possible to automatically adjust the amount of carbon dioxide to be fed and mixed into the contaminated water, thereby maintaining an even hydrogen ion concentration exponent. Thus, the colloid particles in the contaminated water can be removed in a more efficient and stable manner.

BEST MODE FOR CARRYING OUT THE INVENTION

Figure 1:
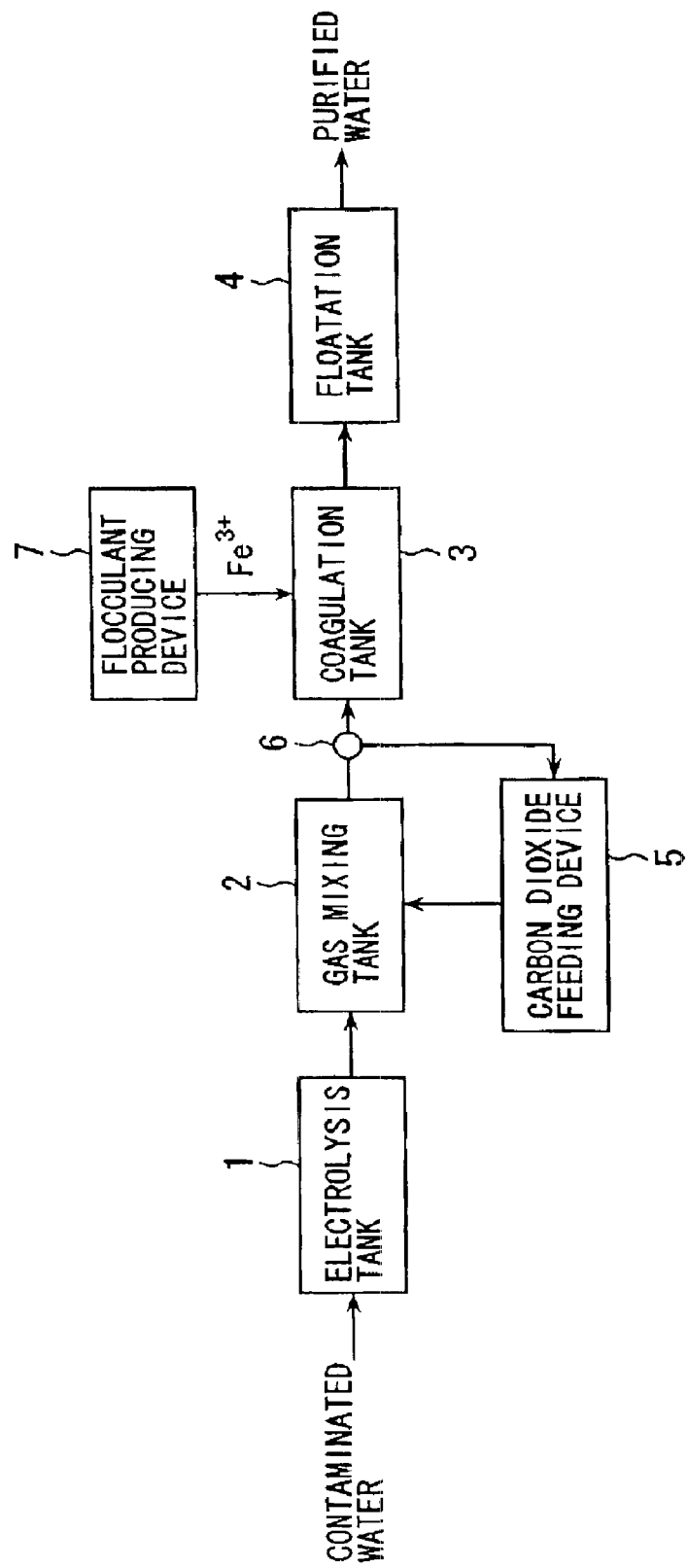
FIG. 1 is a block diagram showing the structure of an apparatus for purification of water which is an embodiment of the present invention.

FIG. 1 is a block diagram showing the structure of an apparatus for purification of water which is an embodiment of the present invention. In the figure, the apparatus for purification of water of the present invention mainly comprises, in the order from the side where contaminated water is introduced, an electrolysis tank 1 for electrolyzing the contaminated water, a gas mixing tank 2 for mixing carbon dioxide into the contaminated water electrolyzed, a coagulation tank 3 for mixing a flocculant into the contaminated water to coagulate impurities in the contaminated water, and a floatation tank 4 for floating the impurities coagulated.

The electrolysis tank 1 has an electrode made of stainless steel, platinum, carbon and the like, to which direct current is applied through a controller (not shown) for controlling the amount of electricity. A negative electrode is covered with a coating made of titanium, iridium, palladium, platinum, hafnium and the like on the surface thereof in order to prevent itself from being dissolved by the applied electricity. In contaminated water introduced into the above electrolysis tank, the zeta potential of colloid particles contained in the contaminated water approaches zero by electrolysis. Here, the amount of electricity to be applied to the electrode is controlled by the controller so that the zeta potential is a weak negative value.

A carbon dioxide feeding device 5, by which the amount of carbon dioxide ($CO_2$) to be fed can be adjusted, is connected to the gas mixing tank 2. If the pH of the contaminated water electrolyzed by the electrolysis tank 1 is high, carbon dioxide fed from the carbon dioxide feeding device 5 is mixed. On the downstream side of the gas mixing tank 2 and the upstream side of the coagulation tank 3, disposed is a pH sensor 6 for detecting a hydrogen ion concentration exponent (pH), and the output of the pH sensor 6 is inputted to the carbon dioxide feeding device 5. Based on an inputted value (pH) of the pH sensor 6, the carbon dioxide feeding device 5 automatically adjusts the amount of carbon dioxide to be fed into the gas mixing tank 2 and controls the pH of the contaminated water detected by the pH sensor 6 to be from 5.3 to 8.

Figure 2:
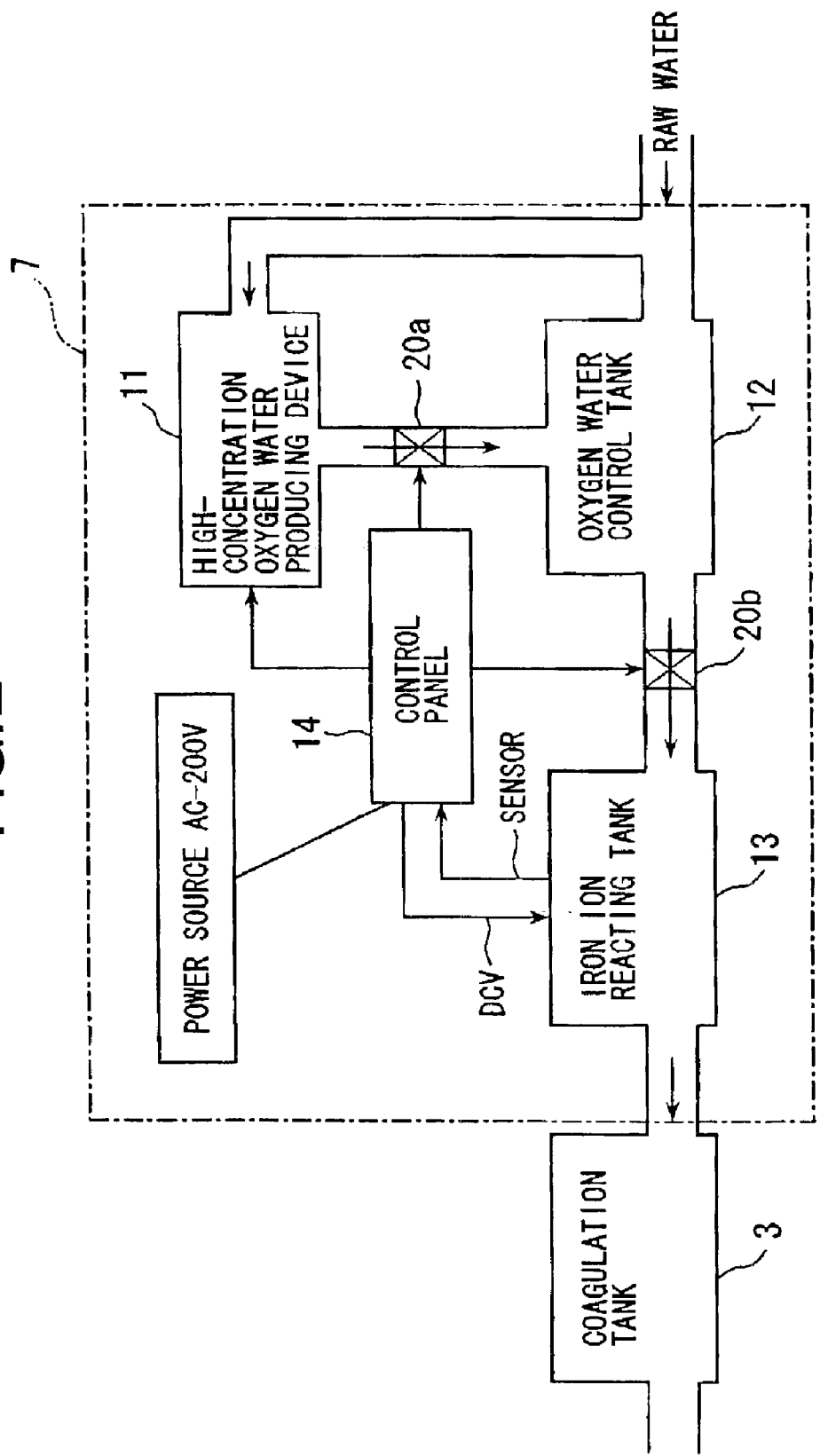
FIG. 2 is a schematic view showing the structure of a flocculant producing device shown in FIG. 1.
Figure 3:
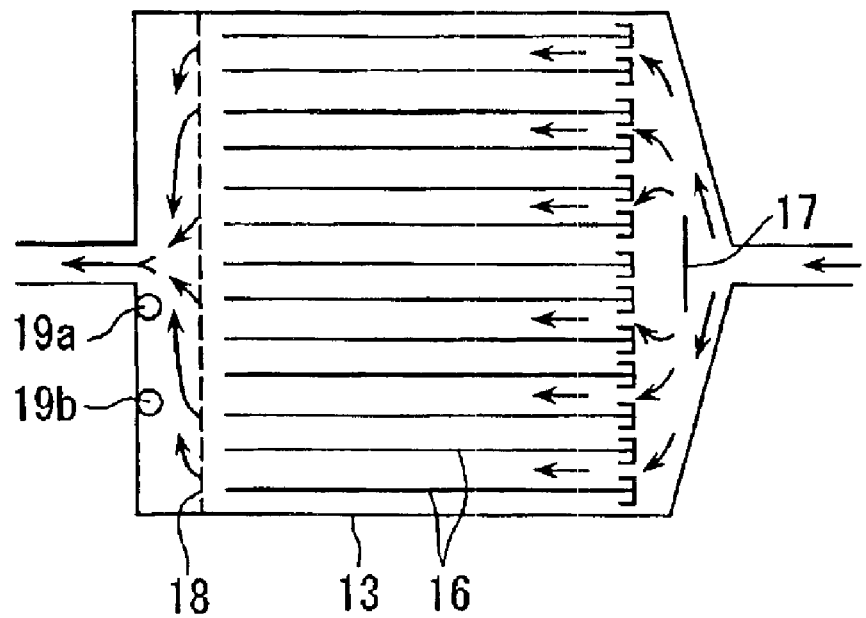
FIG. 3 shows the structure of an iron ion reaction tank in FIG. 2 wherein (a) is an inside plan view and (b) is an inside side view.
Figure 3:
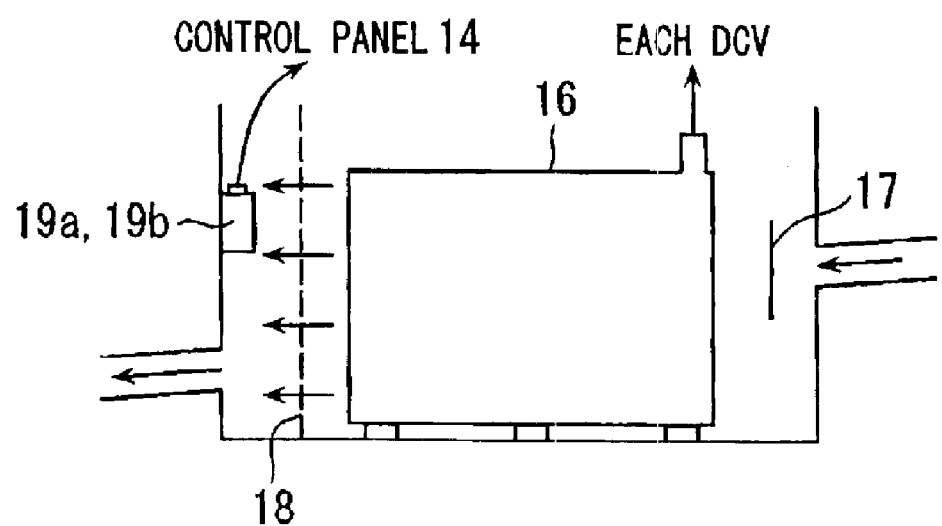

To the coagulation tank 3, connected is a flocculant producing device 7 for obtaining ferric ions ($Fe^{3+}$) as a flocculant by electrolyzing an iron electrode to cause fast oxidation. The flocculant producing device 7 will be explained below in detail referring to FIGS. 2 and 3. FIG. 2 is a schematic view showing the structure of the flocculant producing device 7, and FIG. 3 shows the structure of an iron ion reaction tank 13 wherein (a) is an inside plan view and (b) is an inside side view.

The flocculant producing device 7 comprises a high-concentration oxygen water producing device 11 for producing oxygen-dissolved water, that is the water in which a high concentration oxygen is dissolved, an oxygen water control tank 12 for controlling an oxygen concentration by mixing the oxygen-dissolved water produced into raw water which is the water to be treated, an iron ion reacting tank 13 for eluting iron ions by electrolyzing an iron electrode and making the contact between the iron ions and oxygen in the oxygen-dissolved water to obtain a flocculant, and a control panel 14 as a control means for controlling the amount of electricity to be applied to the high-concentration oxygen water producing device 11 and the iron electrode.

The high-concentration oxygen water producing device 11 makes oxygen which is fed from an oxygen cylinder (not shown) dissolve in the water introduced from the raw water to form small bubbles having a diameter from 0.01 to 0.05 mm, thereby producing oxygen-dissolved water. The oxygen, which is formed into fine bubbles, can be efficiently dissolved in water, and the high-concentration oxygen water producing device 11 provides oxygen-dissolved water having an oxygen concentration from 20 to 50 ppm, which is much higher than the general value of oxygen dissolution into water, that is from 10 to 15 ppm.

The oxygen water control tank 12 is a tank for mixing the oxygen-dissolved water obtained by the high-concentration oxygen water producing device 11 into raw water to control the oxygen concentration. The oxygen-dissolved water of which oxygen concentration has been adjusted by the oxygen water control tank 12 is fed into the iron ion reacting tank 13 of the next step.

As shown in FIG. 3, the iron ion reacting tank 13 is provided with a plurality of electrode plates 16, as plate-like iron (Fe) electrodes, being arranged in a row in a direction perpendicular to the flowing direction of the oxygen-dissolved water. The surface of each of the electrode plates 16 is parallel to the flowing direction of the oxygen-dissolved water. The interval between the adjacent electrode plates 16 is 10 mm. A voltage is applied to each of the electrode plates 16 so that each plate has the polarity opposite to the polarity of the next plate.

In front of the electrode plates 16 in the flowing direction of the oxygen-dissolved water, provided is an adjusting plate 17 for introducing the oxygen-dissolved water from the oxygen water control tank 12 into the areas between the electrode plates 16 evenly. On the rear side of the electrode plates 16 in the flowing direction of the oxygen-dissolved water, provided is a punched plate 18 having holes all over the surface uniformly. On the downstream side of the electrode plates 16, provided are an iron ion concentration sensor 19a for detecting the $Fe^{3+}$ concentration in the water and an oxygen concentration sensor 19b for detecting the oxygen concentration in the water.

Based on the $Fe^{3+}$ concentration detected by the iron ion concentration sensor 19a, a control panel 14 controls the amount of the oxygen-dissolved water to be fed from the high-concentration oxygen water producing device 11 to the oxygen water control tank 12, the oxygen concentration of the oxygen-dissolved water produced by the high-concentration oxygen water producing device 11, the amount of the direct current voltage (DCV) applied between the electrode plates 16, and the amount of the oxygen-dissolved water introduced into the areas between the electrode plates 16.

The amount of the oxygen-dissolved water fed from the high-concentration oxygen water producing device 11 to the oxygen water control tank 12 is adjusted by controlling the opening degree of a solenoid operated valve 20a which is disposed between the high-concentration oxygen water producing device 11 and the oxygen water control tank 12. The oxygen concentration of the oxygen-dissolved water produced by the high-concentration oxygen water producing device 11 is adjusted by controlling the amount of oxygen fed into the high-concentration oxygen water producing device 11 and the amount of raw water supplied based on the oxygen concentration detected by the oxygen concentration sensor 19b. The amount of the oxygen-dissolved water introduced into the areas between the electrode plates 16 is adjusted by controlling the opening degree of a solenoid operated valve 20b which is disposed between the oxygen water control tank 12 and the iron ion reacting tank 13.

In the flocculant producing device 7 having the above-described structure, the oxygen-dissolved water having an oxygen concentration from 20 to 50 ppm obtained by the high-concentration oxygen water producing device 11 is mixed with the raw water in the oxygen water control tank 12 and, after adjustment of the oxygen concentration, flows into the iron ion reacting tank 13. The oxygen-dissolved water in the iron ion reacting tank 13 is further introduced into the areas between the electrode plates 16 uniformly by the adjusting plate 17.

While the above operation is being conducted, in the iron ion reacting tank 13, Fe is eluted from the electrode plates 16 by the voltage applied to the electrode plates 16 to generate $Fe^{2+}$ and $Fe^{3+}$. Here, by supplying the oxygen-dissolved water having an oxygen concentration from 20 to 50 ppm in which oxygen is dissolved at a high concentration from the oxygen water control tank 12, $Fe^{2+}$ is oxidized at a high speed and completely oxidized into the form of more stable $Fe^{3+}$.

In the flocculant producing device 7, it is also possible that, based on the $Fe^{3+}$ concentration on the downstream side of the electrode plates 16, the control panel 14 controls the amount of the oxygen-dissolved water to be fed, the oxygen concentration of the oxygen-dissolved water, and the amount of electricity applied or water supplied to the areas between the electrodes so that the $Fe^{3+}$ concentration becomes maximum and further is maintained at the same level, thereby obtaining $Fe^{3+}$ with high efficiency.

By employing Fe, which is widely found in nature and inexpensive, as electrodes, the costs for manufacturing and running the apparatus can be held to be low. In addition, since dissolution of oxygen into water raises conductivity of water, the voltage necessary for electrolysis of the electrode plates 16 can be decreased. Therefore, it is possible to use a solar battery as a power source of the apparatus, which means that the flocculant producing device 7 saves energy.

Reverting to FIG. 1, in the coagulation tank 3, $Fe^{3+}$ supplied from the flocculant producing device 7 is mixed into the contaminated water fed from the gas mixing tank 2, thereby coagulating the colloid particles in the contaminated water to form flocs. The contaminated water fed from the gas mixing tank 2 has been adjusted to have a pH in which the coagulation is caused most efficiently by $Fe^{3+}$ (pH 5.3–6.5) and has low zeta potential. Therefore, the amount of $Fe^{3+}$ necessary for neutralizing the contaminated water can be small, which leads to the most efficient coagulation. In the floatation tank 4, the flocs formed in the coagulation tank 3 are floated and separated by pressure floatation or the like to obtain purified water where the impurities have been removed.

In the apparatus for purification of water described above, the contaminated water introduced into the electrolysis tank 1, as the zeta potential of the colloid particles contained in the contaminated water approaches plus-minus zero by electrolysis, has a weak negative value. The contaminated water which contains the colloid particles having the low zeta potential is fed into the gas mixing tank 2 and mixed with carbon dioxide from the carbon dioxide feeding device 5 to be adjusted to have a pH from 5.3 to 8.

In the coagulation tank 3 in the next step, the water is subjected to coagulation by mixing $Fe^{3+}$ supplied from the flocculant producing device 7. Since the $Fe^{3+}$ maintains the contaminated water to have a pH from 5.3 to 8, which enables the most efficient coagulation, in addition to the low zeta potential of the colloid particles in the contaminated water introduced from the gas mixing tank 2, even a small amount of $Fe^{3+}$ supplied from the flocculant producing device 7 can realize sufficient coagulation. The flocs formed by the coagulation are removed by the floatation tank 4 to discharge purified water.

The purified water obtained as above is not colored because $Fe^{3+}$ is used as a flocculant, and has no harmful effect on human health if $Fe^{3+}$ is discharged without being consumed. Moreover, according to the present invention, since the amount of $Fe^{3+}$ necessary for purification can be small, an apparatus for purification of water requiring a reduced amount of flocculant ($Fe^{3+}$) with extremely low running costs can be obtained.

Figure 4:
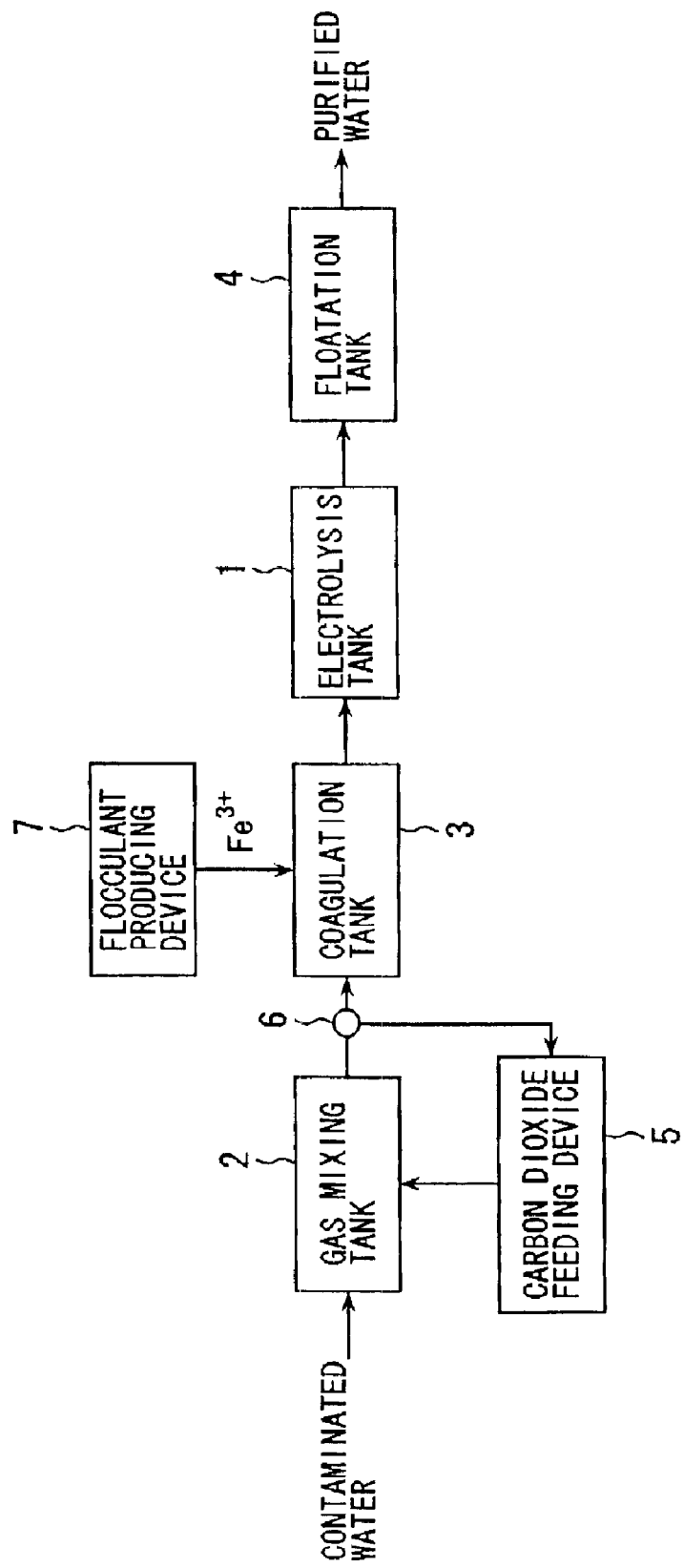
FIG. 4 is a block diagram showing the structure of an apparatus for purification of water which is another embodiment of the present invention.

The above-described embodiment, as shown in FIG. 1, is an example wherein the electrolysis tank 1 is disposed before the coagulation tank 3. However, the electrolysis tank 1 may be disposed after the coagulation tank 3 as illustrated in FIG. 4.

In this case, the contaminated water to which a flocculant ($Fe^{3+}$) has been added in the coagulation tank 3 and which is then electrolyzed in the electrolysis tank 1 continues coagulation which started in the coagulation tank 3 even in the floatation tank 4. In the floatation tank 4, the flocs formed by coagulation further grow to be large while floating. Therefore, if the electrolysis tank 1 is disposed after the coagulation tank 3, thereby electrolyzing the contaminated water after adding a flocculant ($Fe^{3+}$), it is also possible to lower the zeta potential of the colloid particles in the contaminated water and to coagulate the impurities in the contaminated water with a reduced amount of flocculant and with high efficiency as mentioned above.

In the above embodiments, $Fe^{3+}$ produced by the flocculant producing device 7 is used as a flocculant. On the other hand, it is also possible to employ other metal ions eluted by electrolyzing metal plates made of aluminum, copper, zinc or the like depending on the ingredients of impurities dissolved in contaminated water. In this case, the zeta potential of the colloid particles contained in the contaminated water is also lowered by the electrolysis tank 1 and approaches plus-minus zero, which enables efficient coagulation of the impurities in the contaminated water with a reduced amount of these metal ions supplied.

INDUSTRIAL APPLICABILITY

The apparatus and method for purification of water according to the present invention can be used as an apparatus and method for purification of water for coagulating and removing impurities in contaminated water in rivers, lakes, ponds and the like by adding a flocculant to the contaminated water.

What is claimed is:

1. Apparatus for purifying contaminated water containing colloidal particles by coagulating said colloidal particles by a counter-ion effect of a flocculant, and separating said colloidal particles from said water, said apparatus comprising:

a coagulation tank for contacting said contaminated water containing said colloidal particles with said flocculant, said flocculant comprising ferric ions, to coagulate said colloidal particles in said contaminated water;

an electrolysis tank comprising a pair of electrodes made of a material selected from the group consisting of: stainless steel, platinum, and carbon, for electrolyzing said contaminated water to lower a zeta potential of said colloidal particles in said contaminated water to a negative value, and wherein a negative electrode of said pair of electrodes is coated with a material selected from the group consisting of: titanium, iridium, palladium, platinum, and hafnium; said electrolysis tank being positioned alternatively upstream and downstream of said coagulation tank;

a gas mixing tank for mixing carbon dioxide into said contaminated water; and a flotation tank for separating said coagulated colloidal particles from said contaminated water to produce purified water.

* * * * *